(12) United States Patent  
Windstrup et al.

(10) Patent No.: US 8,907,811 B2  
(45) Date of Patent: Dec. 9, 2014

(54) MULTI-MODE DISPLAY

(75) Inventors: Sonny Windstrup, Copenhagen (DK); Martin Manniche, Laguna Hills, CA (US); Karl Jonsson, Rancho Santa Margarita, CA (US)

(73) Assignee: Greenwave Systems Pte. Ltd., Singapore (SG)

( * ) Notice: Subject to any disclaimer, the term of this patent is extended or adjusted under 35 U.S.C. 154(b) by 525 days.

(21) Appl. No.: 13/343,099

(22) Filed: Jan. 4, 2012

(65) Prior Publication Data

US 2012/0169511 A1 Jul. 5, 2012

Related U.S. Application Data

(60) Provisional application No. 61/429,748, filed on Jan. 4, 2011.

(51) Int. Cl.
*G08B 23/00* (2006.01)
*G08B 25/00* (2006.01)
*G05D 23/00* (2006.01)
*B60L 11/18* (2006.01)

(52) U.S. Cl.
CPC ............ *B60L 11/184* (2013.01); *Y02T 10/7094* (2013.01); *B60L 2230/16* (2013.01); *Y02T 10/7005* (2013.01); *Y02T 90/163* (2013.01); *Y02T 90/169* (2013.01); *Y02T 90/14* (2013.01); *Y02T 90/128* (2013.01); *Y04S 30/14* (2013.01)
USPC .................. 340/870.02; 340/525; 340/691.6; 340/7.55; 340/636.1; 236/94

(58) Field of Classification Search
USPC ............. 340/525, 691.6, 7.55, 870.02, 636.1; 236/94
See application file for complete search history.

(56) References Cited

U.S. PATENT DOCUMENTS

| 7,845,576 B2* | 12/2010 | Siddaramanna et al. ....... 236/94 |
| D638,373 S | 5/2011 | Windstrup |
| 2005/0134791 A1* | 6/2005 | Iwata et al. ................... 349/187 |
| 2011/0032110 A1* | 2/2011 | Taguchi .................... 340/636.1 |
| 2011/0137519 A1* | 6/2011 | Christie ........................ 701/36 |
| 2011/0191186 A1* | 8/2011 | Levy et al. ................. 705/14.58 |

FOREIGN PATENT DOCUMENTS

WO 2011103249 A2 8/2011

OTHER PUBLICATIONS

Lamonica, Martin, Ecototality, Cisco connect Internet-savvy EV charger, CNET News, Jan. 31, 2011, retrieved on Jan. 31, 2011 from http://news.cnet.com/8301-11128_3-20029933-54.html.

* cited by examiner

*Primary Examiner* — Steven Lim
*Assistant Examiner* — Omeed Alizada
(74) *Attorney, Agent, or Firm* — Bruce A. Young

(57) ABSTRACT

A networked display has multiple modes of operation. In the first operating mode, the display receives and shows information related to charging an electric vehicle. In a second mode of operation, the display receives and shows information related to home energy usage. Other operating modes may also be supported.

17 Claims, 8 Drawing Sheets

MULTI-MODE DISPLAY

CROSS-REFERENCE TO RELATED APPLICATIONS

This application claims the benefit of U.S. Provisional Application No. 61/429,748 entitled "MULTI_MODE DISPLAY" filed on Jan. 4, 2011, the entire contents of which are hereby incorporated by reference.

BACKGROUND

1. Technical Field

The present subject matter relates to a display for showing energy related information. It further relates to a display with multiple modes of operation.

2. Description of Related Art

As consumers become more interested in energy conservation, many consumers find it desirable to monitor their energy consumption in various ways. Some consumers may utilize their computer to monitor their energy consumption using data from their power company or a smart meter in their home. Other consumers may utilize a special purpose display designed to show information collected from the smart meter.

As a part of the move to more energy efficient lives, many consumers may purchase electric vehicles (EV) that may be charged using home charging stations. These home charging stations provide power from the electric grid to the EV and may or may not pass that power through the home electric meter as some charging stations may have their own metering systems. Many charging stations may provide a display of some sort for monitoring the status of the battery in the EV.

SUMMARY

A display apparatus includes a display module and a networked controller. The display module is configured to show elements from a fixed set of displayable elements. The networked controller is configured to receive information about energy usage over a network and to control the display module. The networked controller is further configured to control the display module to show information about charging an electric vehicle in a first operating mode and control the display module to show information about home energy usage in a second operating mode.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. They should not, however, be taken to limit the invention to the specific embodiment(s) described, but are for explanation and understanding only. In the drawings.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Reference now is made in detail to the examples illustrated in the accompanying drawings and discussed below.

Figure 1:
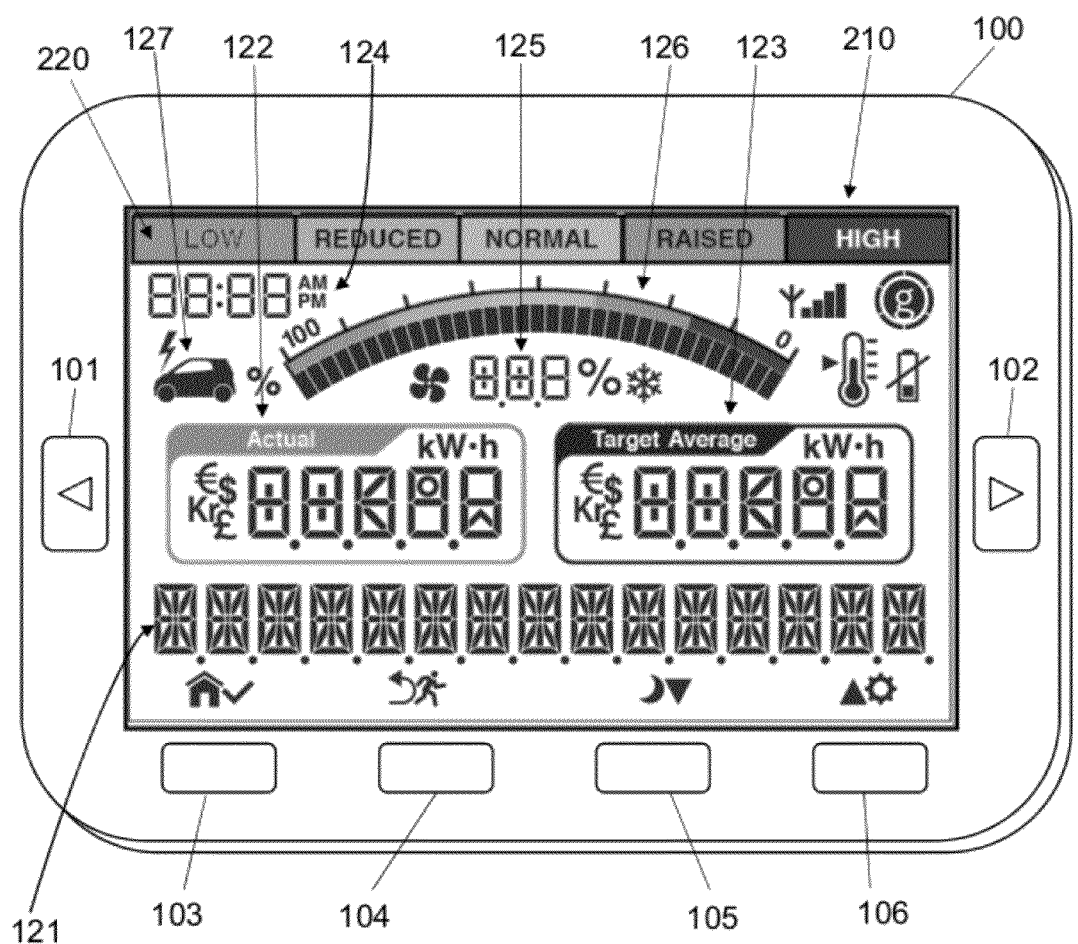
FIG. 1 shows an embodiment of a multi-mode display using a monochrome liquid crystal display (LCD) module with a color overlay.
Figure 2A:
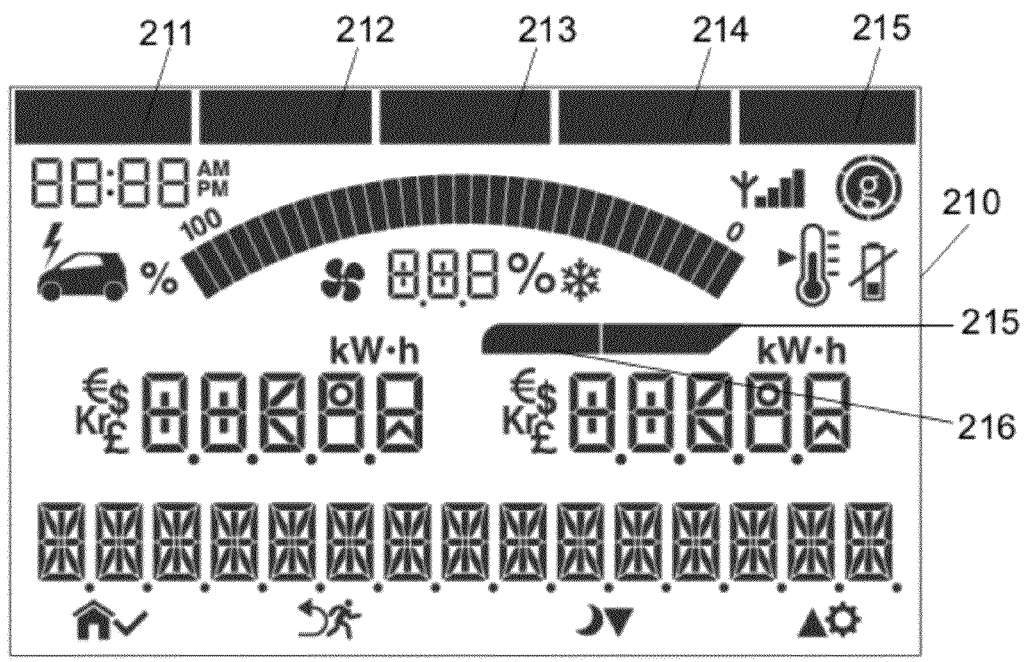
FIG. 2A shows the monochrome LCD of the multi-mode display of FIG. 1.
Figure 2B:
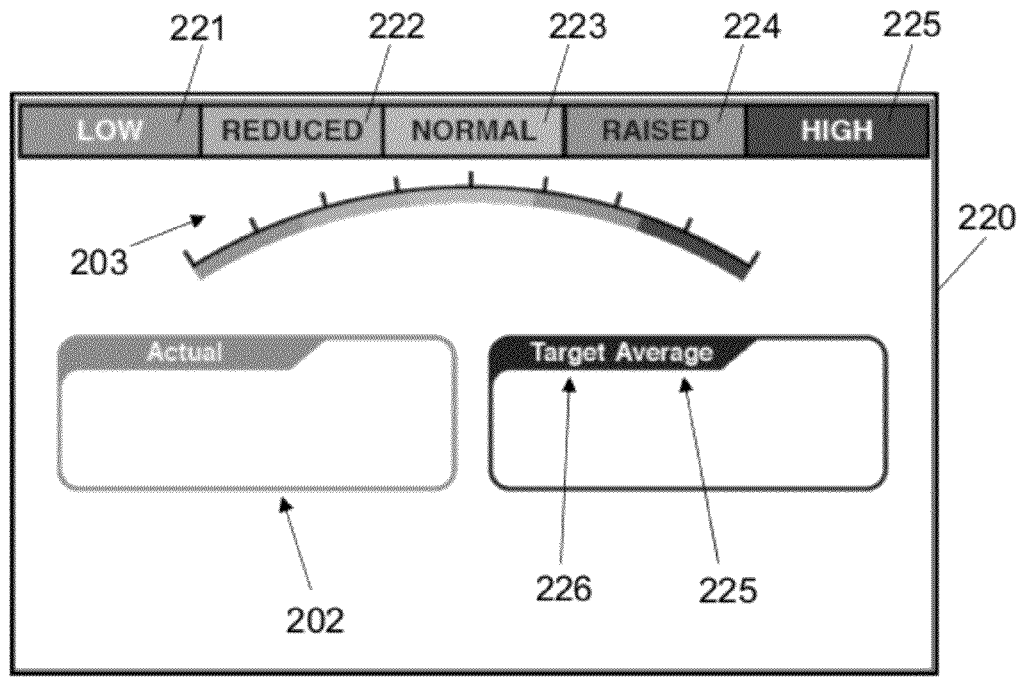
FIG. 2B shows the color overlay of the multi-mode display of FIG. 1.

FIG. 1 shows an embodiment of a multi-mode display 100 using a monochrome liquid crystal display (LCD) module 210 of FIG. 2A with a color overlay 220 of FIG. 2B. The multi-mode display 100 may be back-lit or may use ambient light from the room for visibility. Other embodiments may use different display technology including, but not limited to, thin film transistor (TFT) color LCD, organic light emitting diode (OLED), cathode ray tube (SRT), plasma, or other display technologies. The multi-mode display 100 may have several buttons or other user input mechanism for user control located in the bezel. In the embodiment shown, back button 101 and forward button 102 may be used to control the mode of the multi-mode display 100. The Home/OK button 103, the Away/Cancel button 104, the Night/Down button 105 and Up/Settings button 106 may be used for various purposes within the user interface (UI) of the multi-mode display 100. Other embodiments may include a touchscreen as another user input mechanism for the UI.

The multi-mode display 100 may include various independently addressable display elements, or a fixed set of displayable elements, that may vary between embodiments. Other embodiments may use a matrix addressable pixel-based display. Display elements above the UI buttons 103-106 may be included to allow the current function of the buttons 103-106 to be displayed. The embodiment shown in FIG. 1 includes a 15 character text line 121. Each character of the text line 121 may be made up of 15 segments that may be used to create a wide variety of symbols including representations of most letters used in languages using variations of the Latin alphabet, including, but not limited to, English, Danish, German, French, Spanish, Norwegian, Swedish, and others. Other embodiments may use other implementations for text such as a 5×7 or other sized dot matrix, a 7, 14, or 16 segment display or some other type of character display.

The multi-mode display 100 also may include other delineated display areas such as the "actual" display area 122 and/or the target/average display area 123. The "actual" display area 122 and target/average display area 123 may include display elements for various currency symbols including, but not limited to US Dollars ($), British Pounds (£), Euros (€) and/or Danish Kroner (Kr) although another embodiment of a multi-mode display targeting distribution in Asia might include currency symbols such as the Chinese Yuan and Japanese Yen (¥), the Indian Rupee (₹), and the Republic of Korea Won (₩). The display areas 122, 123 may also include display elements for showing kW and/or kW-h to allow for energy and/or power readings to be displays. The display areas 122, 123 may also include a multi-character display allowing numbers and/or other characters to be displayed. In the embodiment shown, the "actual" display area 122 and the target/average display area 123 each include 5 characters. The display areas 122, 123 may also include a degree symbol (°) for indicating that temperature is being displayed.

The multi-mode display 100 may also include a clock display 124 allowing the current time to be displayed in either 24 hour or 12 hour format and may have current value display 125 and a multi-purpose gauge display 126 that may be used to show the same value at some times and different values at other times. An electric vehicle (EV) icon 127 may also be included on the multi-mode display 100. Other icons or symbols may also be included in some embodiments such as a fan indication, a snowflake to indicate that an air conditioner is operating, a thermometer to indicate that the multi-mode display may be operating as a thermostat, a wireless signal strength meter, a low battery indication and/or a company logo. Other embodiments may include other icons or symbols and yet other embodiments may not include all the elements shown in FIG. 1.

Each individual element of the display may be controlled to be either on or off although in some cases, not every combination of elements may be supported. For example, in some embodiments, the 15 segment display may only support a limited number of characters, such as 128 or 256 different pre-determined characters, instead of the 32768 different possible combinations of the 15 elements. Some embodiments may support a display technology allowing for an intensity level or color to be set instead of having each element being only on or off.

FIG. 2A shows the base monochrome LCD 210 of the multi-mode display 100 of FIG. 1. In addition to the display elements discussed above, several other display elements may be included in the LCD 210 that may interact with the color overlay 220 of FIG. 2B. Indication blocks 211, 212, 213, 214 and 215 may each be individually turned on or off although some embodiments may only allow, at most, a single indication block to be off at any one time. Other indication blocks 215, 216 may also be included to interact with other parts of the color overlay 220.

FIG. 2B shows the color overlay 220 of the multi-mode display of FIG. 1. The color overlay 220 may include colored areas to give a more appealing look to the multi-mode display 100. A backlight shining through the monochrome LCD 210 then through the color overlay 220 in the areas where there is no display element, or the display element is off, may emit light based on the color of that section of the color overlay 220. If a display element is on, blocking the light, very little light may pass through the color overlay 220 so that the color is not very noticeable. Indication block 211 may be turned off to highlight a LOW indicator 221. Indication block 212 may be turned off to highlight a REDUCED indicator 222. Indication block 213 may be turned off to highlight a NORMAL indicator 223. Indication block 214 may be turned off to highlight a RAISED indicator 224. Indication block 215 may be turned off to highlight a HIGH indicator 225. Other embodiments may use a different number of indicator blocks, including zero, to interact with sections of the color overlay. Other embodiments may use different words or symbols, such as words from another language, or words meant to convey a different set of meanings, for the sections of the color overlay 200.

Other sections of the color overlay may always be illuminated, such as the box 202 around the "actual" display area. A color overlay 203 over the gauge may provide a color code for the current level shown on the gauge. The box around the target/average display area may be black with clear text such as "Target" 226 and "Average" 225. If the indication block 215 is on, light from the backlight is blocked from shining through "Average" 225, making it difficult to read, but if the indication block 215 is off, light from the backlight may shine through "Average" 225 making it easy to read against the black background. Indication block 216 interacts with "Target" 226 in a similar way to either hide or highlight the text.

The multi-mode display 100 may have a variety of operating modes to allow different types of information to be displayed on a single display. In some embodiments, an electric vehicle charging station may be monitored. In some embodiments the multi-mode display 100 may be used as a thermostat. In some embodiments the multi-mode display 100 may be able to display a variety of information related to home energy usage. Other embodiments may have modes for displaying other information.

Figure 3A:
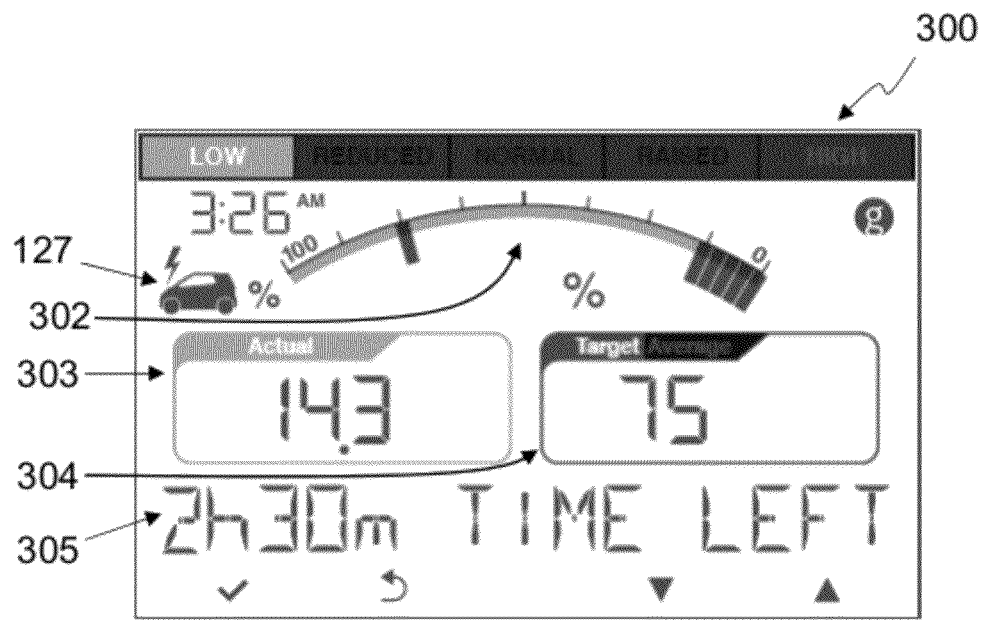
FIGS. 3A and 3B show two different possible display patterns of the multi-mode display of FIG. 1 related to charging an electric vehicle.
Figure 3B:
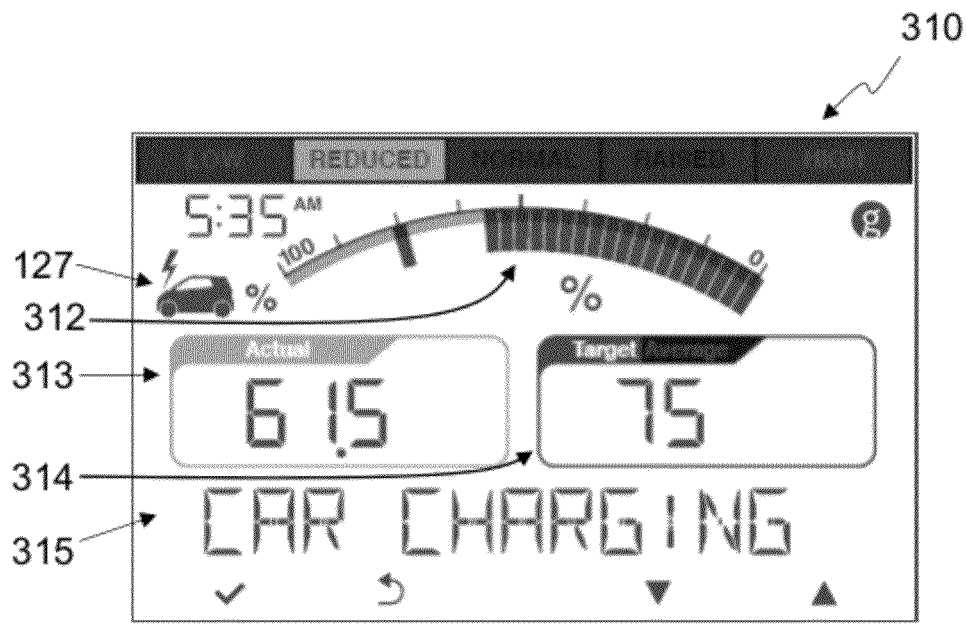

FIGS. 3A and 3B show two different possible display patterns for the multi-mode display 100 related to charging an electric vehicle (EV). Both the display pattern 300 of FIG. 3A and the display pattern 310 of FIG. 3B turn on the EV charging icon 127 to indicate that the multi-mode display 100 is currently showing information related to charging an EV. Display pattern 300 may show the current battery charge level of 14.3% in the "Actual" display area 303 and a target charge level of 75% in the target/average display area 304. The gauge 302 may show both the actual battery charge and the target in a graphical manner. The character display 305 shoes an amount of time left to charge the battery to the target level. The indicators at the top of the display show "LOW" to highlight that the battery is below a pre-determined charge level.

Display pattern 310 in FIG. 3B may show a current battery charge level of 61.5% in the "Actual" display area 313 and the target of 75% in the target/average display area 314. The character display 315 has been changed to simply indicate that the car is charging. The indicators at the top of the display have changed to highlight "REDUCED" to show that the battery is partially charged.

Figure 4A:
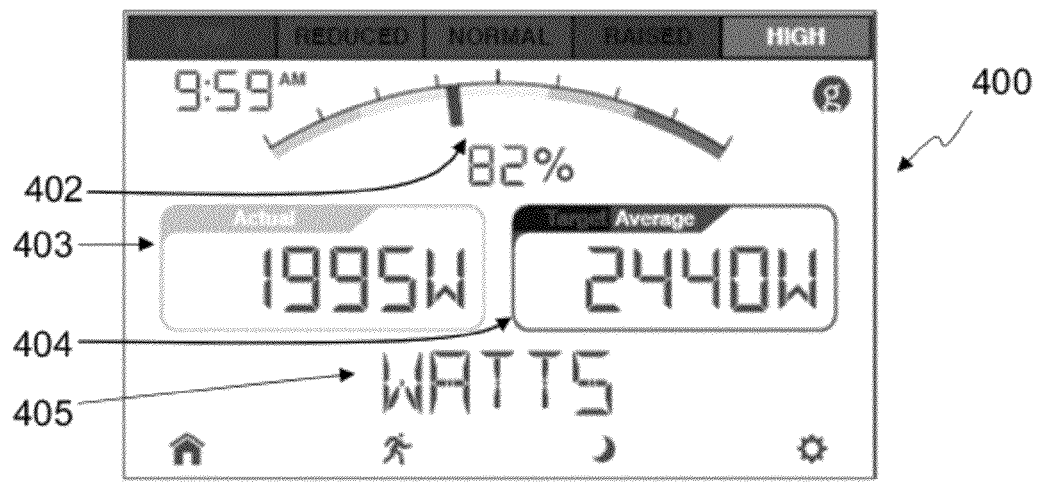
FIGS. 4A, 4B and 4C show three different possible display patterns of the multi-mode display of FIG. 1 related to home energy usage.
Figure 4B:
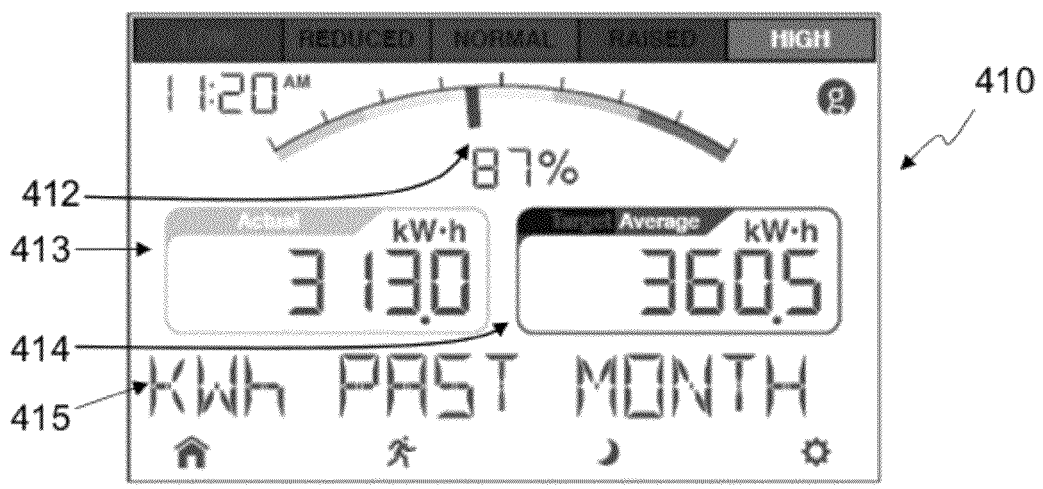
Figure 4C:
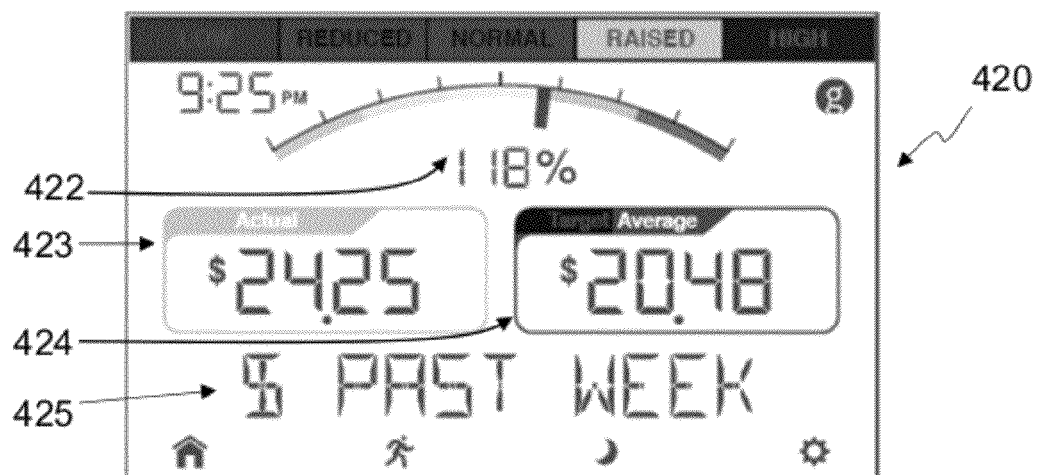

FIGS. 4A, 4B and 4C show three different possible display patterns of the multi-mode display 100 related to home energy usage. Display pattern 400 of FIG. 4A may show current power usage in the "Actual" display area 403 and the average power usage over a pre-determined period of time in the target/average display area 404. The current power usage as a percentage of the average power usage may be shown on the gauge 402 and the character display may show "WATTS" to indicate that a current power level is being displayed.

Display pattern 410 of FIG. 4B shows an historical energy usage for the home. The "Actual" display area 413 may show an amount of energy used in the current billing cycle or in the last 30 days or other pre-determined time period, depending on the embodiment. The target/average display area 414 may show the average energy usage per billing cycle or other pre-determined time period over the last year or other time period. Character display 415 may describe what is being shown and the gauge 412 may show the percentage of the month-to-date energy usage compared to the average energy usage.

FIG. 4C shows a display pattern 420 that provides energy cost information. The "Actual" display area 423 may be used to show the cost of energy used so far this week or other time period. The target/average display area 424 may show the average cost of energy for the household for a similar time period and the gauge 422 may show the percentage relationship between the two. Character display 425 may describe what is being displayed.

Figure 4D:
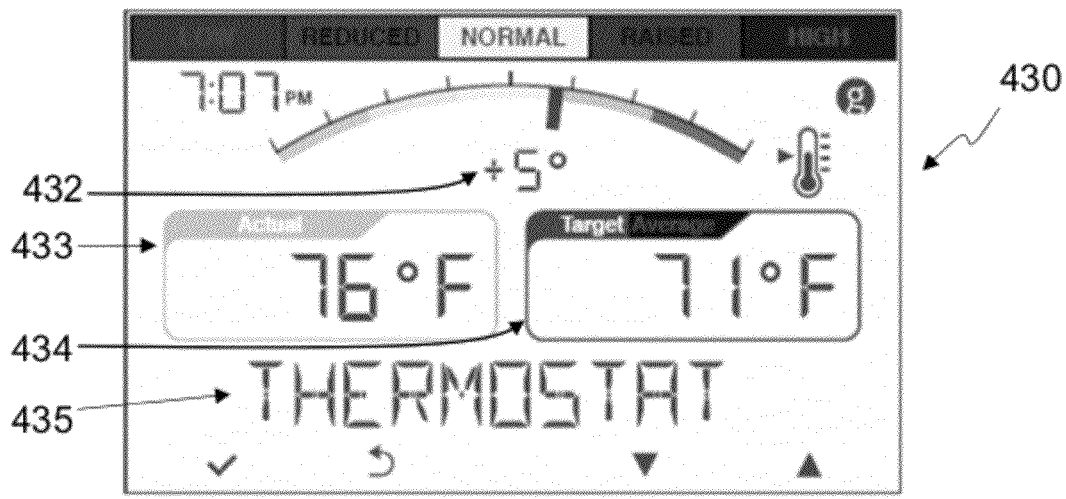
FIG. 4D shows a possible display pattern of the multi-mode display of FIG. 1 related to home heating control.

FIG. 4D shows a display pattern of the multi-mode display 100 related to home heating control allowing the multi-mode display 100 to act as a thermostat as shown in character display 425. The "Actual" display area 433 may give the current indoor temperature in Fahrenheit and the target/average display area 343 may show the current thermostat set point. The gauge 432 may show the temperature difference between the set point and the current temperature.

Figure 5A:
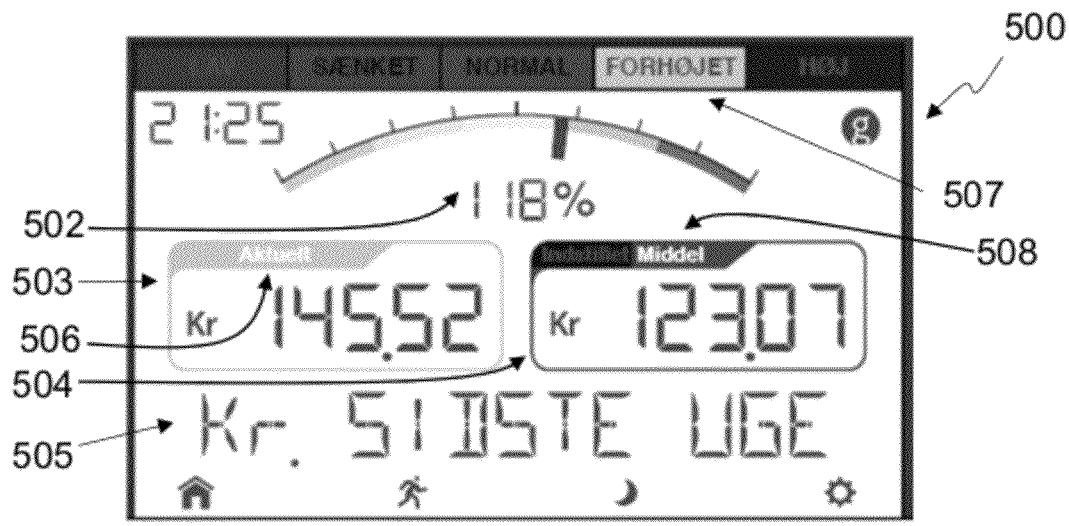
FIGS. 5A and 5B show two different possible display patterns for an alternative embodiment of a multi-mode display customized for Danish speaking customers.
Figure 5B:
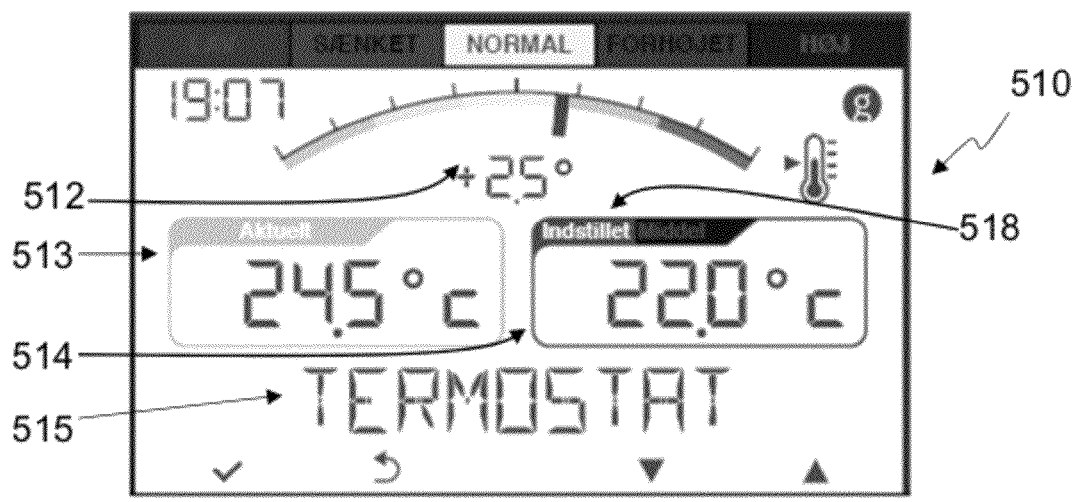

FIGS. 5A and 5B show two different possible display patterns for an alternative embodiment of a multi-mode display customized for Danish speaking customers. The same monochrome LCD 210 may be used but the color overlay may be changed to use Danish words instead of English words. Display pattern 500 of FIG. 5A shows the energy cost display with the actual cost in Danish Kroner shown in the "Actual" display area 503. The Danish equivalent for actual is shown in the color overlay as "Aktuelt" 506. The average cost for energy is shown in the target/average display area 504 with the Danish word for average, "Middel" 508 highlighted through the color overlay. The gauge 502 may show the percentage of average for the current time period and the character display 505 may provide a Danish explanation of what is being displayed.

Display pattern 510 of FIG. 5B shows a thermostat display localized for Denmark. The "Actual" display area 513 may show the current temperature in Celsius and the target/average display area 514 may show the set point. A Danish word "Indstillet" 518 may replace the English word "Target" in the color overlay. The gauge 512 may show the temperature difference between the set point and the current temperature and the character display 515 may show a Danish explanation.

Figure 6:
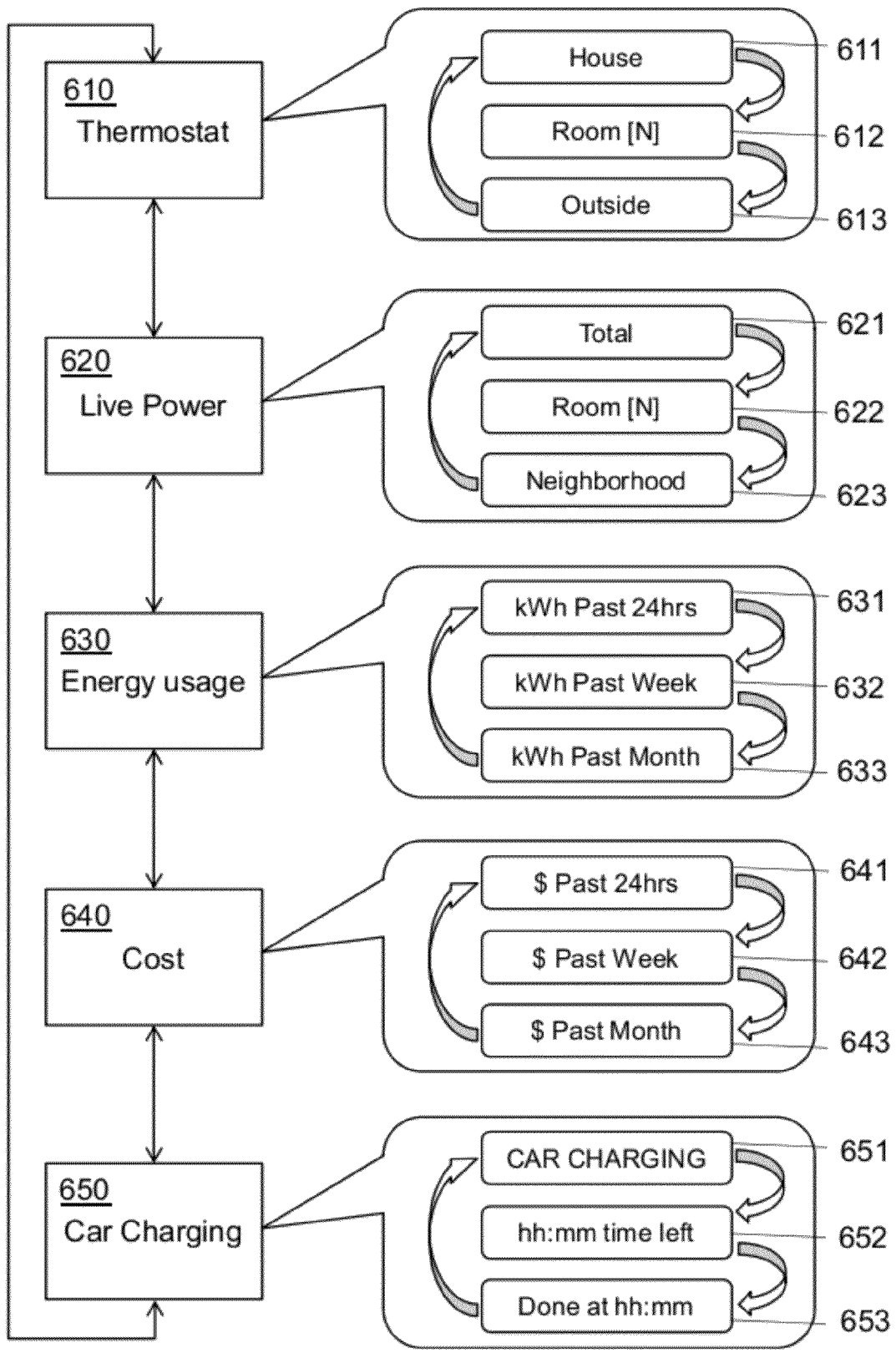
FIG. 6 is a diagram showing various display modes for an embodiment.

FIG. 6 is a diagram showing various display modes for an embodiment of a multi-mode display 100. The boxes on the left show 5 different operating modes. A user may change the operating mode of the multi-mode display 100 by hitting the back button 101 or the forward button 102. Hitting the forward button 102 may move clockwise and the back button 101 may move counterclockwise through the operating modes. The box to the right of each operating mode box may show the specific displays that may be shown in that operating mode. The displays may change on a regular basis, such as every 5 seconds, or in some embodiments, the user may be able to use the up button 106 or down button 105 to change the current display within the operating mode.

In the Thermostat operating mode 610, the multi-mode display 100 may have multiple different display modes. In the House display mode 611, the overall temperature of the home and set point may be displayed such as display pattern 430 of FIG. 4D. In the Room display mode 612, the temperature of a specific room and the thermostat set point for that room may be displayed. In some embodiments, multiple room display modes may be included with a display mode for each supported room in the home. In Outside display mode 613, the outside temperature may be displayed.

In Live Power operating mode 620, the multi-mode display 100 may have multiple different display modes. Total display mode 621 may show the overall power usage of the home as well as a historical average such as shown in display pattern 400 of FIG. 4A. Similar information may be provided for individual rooms in Room display mode 622. Some embodiments may include information related to individual appliances, such as a refrigerator or an air conditioner. Some embodiments may include information allowing the user to compare their power usage against average power usage by their neighbors or some other peer group in display mode 623.

Energy Usage operating mode 630 may support multiple different display modes including energy usage over the last 24 hours 631, energy usage over the last week 632 or energy usage over the last month 633 such as shown in display pattern 410 of FIG. 4B. Cost operating mode 640 may provide cost information of the energy used over the last 24 hours 641, last week 641 (such as shown in display pattern 420 of FIG. 4C) or last month 643.

Car Charging operating mode 650 may allow the user to monitor the status of charging their EV battery. The car charging operating mode 650 may support a car charging display mode 651 similar to the display pattern 310 of FIG. 3B. a time left display mode 652 such as display pattern 300 of FIG. 3A, or a completion time display mode 653 showing the estimated time that the EV battery will reach the target charge level.

Various embodiments may provide for a wide variety of different operating modes and each operating mode may support any number of display modes to show a wide range of data related to energy and/or other topics of interest to the user. The multi-mode display 100 may be customizable by the user to hide certain operating modes and/or display modes if they are not of interest to the user. For example a user may hide the car charging operating mode 650 if the user does not own an EV.

Figure 7:
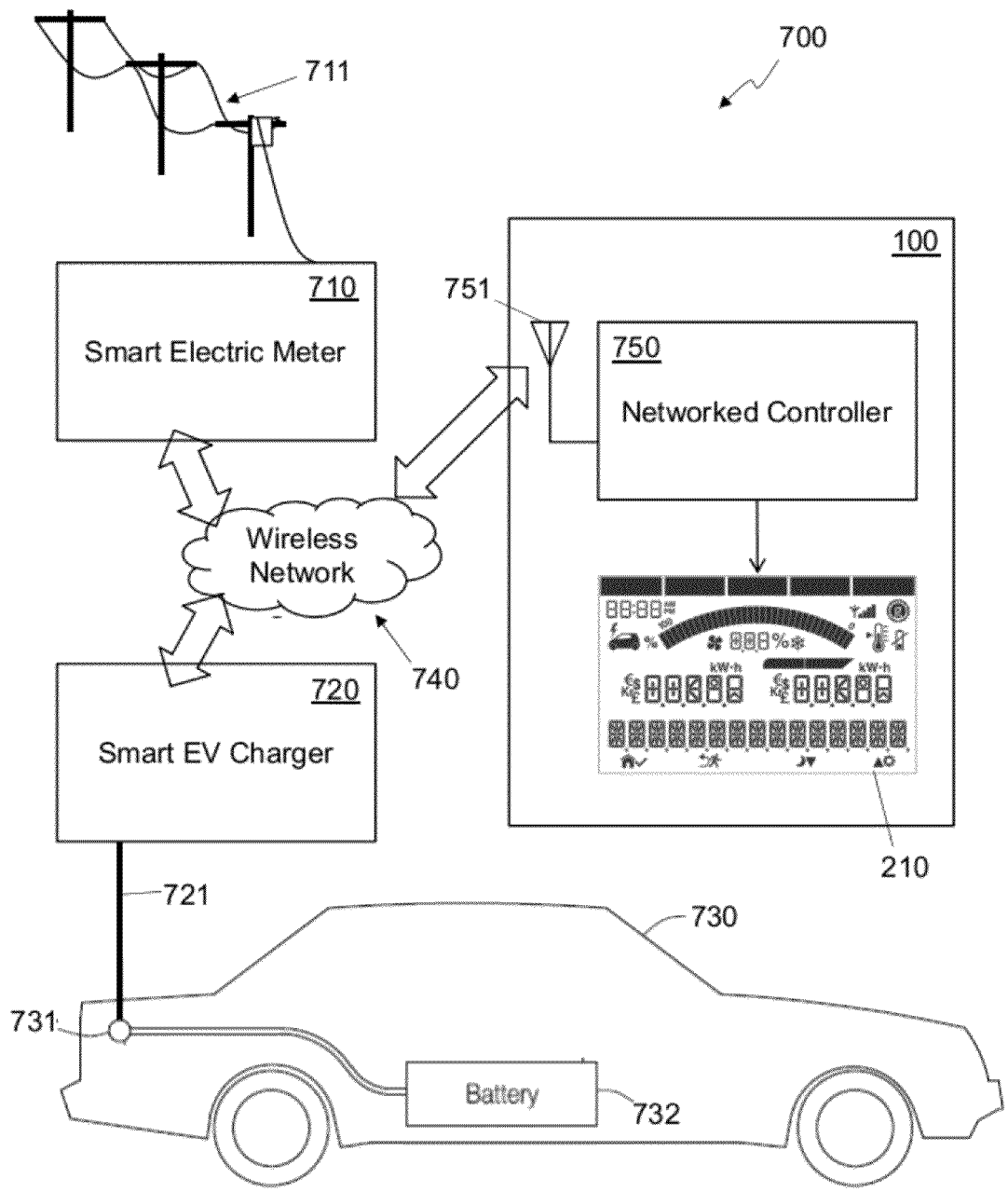
FIG. 7 is a block diagram of a system utilizing an embodiment.

FIG. 7 is a block diagram of a system 700 utilizing the multi-mode display 100. The multi-mode display 100 includes the monochrome display module 210 and a networked controller 750 and may be powered by a battery, a solar panel, a fuel cell, a connection to an external power source such as a home alternating current (AC) circuit, or other power source. The networked controller 750 may be coupled to the buttons 101-106 of the multi-mode display 100 and be configured to detect if the buttons are pressed.

The networked controller 750 may include a microprocessor, memory and a network interface or may be some other configuration of circuitry. The microprocessor may be running a computer program configured to take specific actions in response to various conditions. Any type of network may be supported but in many embodiments, a wireless network 740 using radio frequency communication may be used such as 802.11 Wi-Fi, 802.15.4 Zigbee or Z-Wave. If a wireless network 740 using radio frequency communication is used, the antenna 751 may be included. Some embodiments may use separate integrated circuits for the microprocessor, memory and/or network interface, but in many embodiments, multiple parts of the networked controller 750 may be integrated into a single integrated circuit. In one embodiment utilizing IEEE 802.15.4 Zigbee networking, the microprocessor, memory and Zigbee wireless network interface are integrated into a single integrated circuit such as the CC2539 from Texas Instruments. Another embodiment utilizing Z-Wave networking may use a Zensys ZM3102N module based on the Zensys ZW0301 integrated circuit as an integrated networked controller 750.

The networked controller 750 may control various aspects of the operation of the multi-mode display 100, including, but not limited to, the operating mode and/or the display mode. The networked controller 750 may communicate over the network 740 with a smart electric meter 710 that measure the amount of energy used in the home drawn from a power connection 711 to a utility company. The networked controller 750 may also communicate with a smart EV charger 720 over the network 740. The smart EV charger 730 may provide a power connection 721 to a plug 731 on the electric vehicle (EV) 730 to charge the battery 732. In some embodiments the multi-mode display 100 may communicate over the network 740 with a gateway device or computer running an energy management program. The communication between the various devices may be initiated by the networked controller 750 polling the various devices across the network 740 or by the various devices sending their information to the networked controller 750 as the data is ready to be sent.

The smart electric meter 710 may collect and/or store information about power and/or energy usage by the home. Information that may be provided by the smart electric meter 710 to the multi-mode display 100 may include, but is not limited to, a current meter reading, current power level being provided, a tariff level being charged by the utility at the current time, energy cost information, time and date, temperature, utility alerts, and/or other information. In some embodiments, the gateway device or computer may collect similar data from the smart electric meter 710 or from the utility over the internet, and provide the data to the multi-mode display 100. The networked controller 750 may store the information provided locally and manage the data in such a way that the proper information may be displayed at the user's request. In other embodiments, the networked controller 750 may not store any data locally other than what is being currently displayed. In such an embodiment, the networked controller 750 may detect button presses to send to a gateway or computer device which may determine what to display and send the information to be displayed across the network to the networked controller 750 which then displays the information on the monochrome LCD 210.

The smart EV charger 720 may collect information about the current state of the battery 732, target charge point, estimated charging times and/or completion times as well as other information in some embodiments. The smart EV charge 720 may send the information across the network 740 to the networked controller 750 and/or to a gateway or computer. Depending on the embodiment, the information related to the EV charging may be stored on the multi-mode device 100 or elsewhere. If the multi-mode display 100 is in the car charging operating mode 650, the information from the smart EV charger 720 may be displayed on the monochrome LCD 210 by the networked controller 750.

Figure 8:
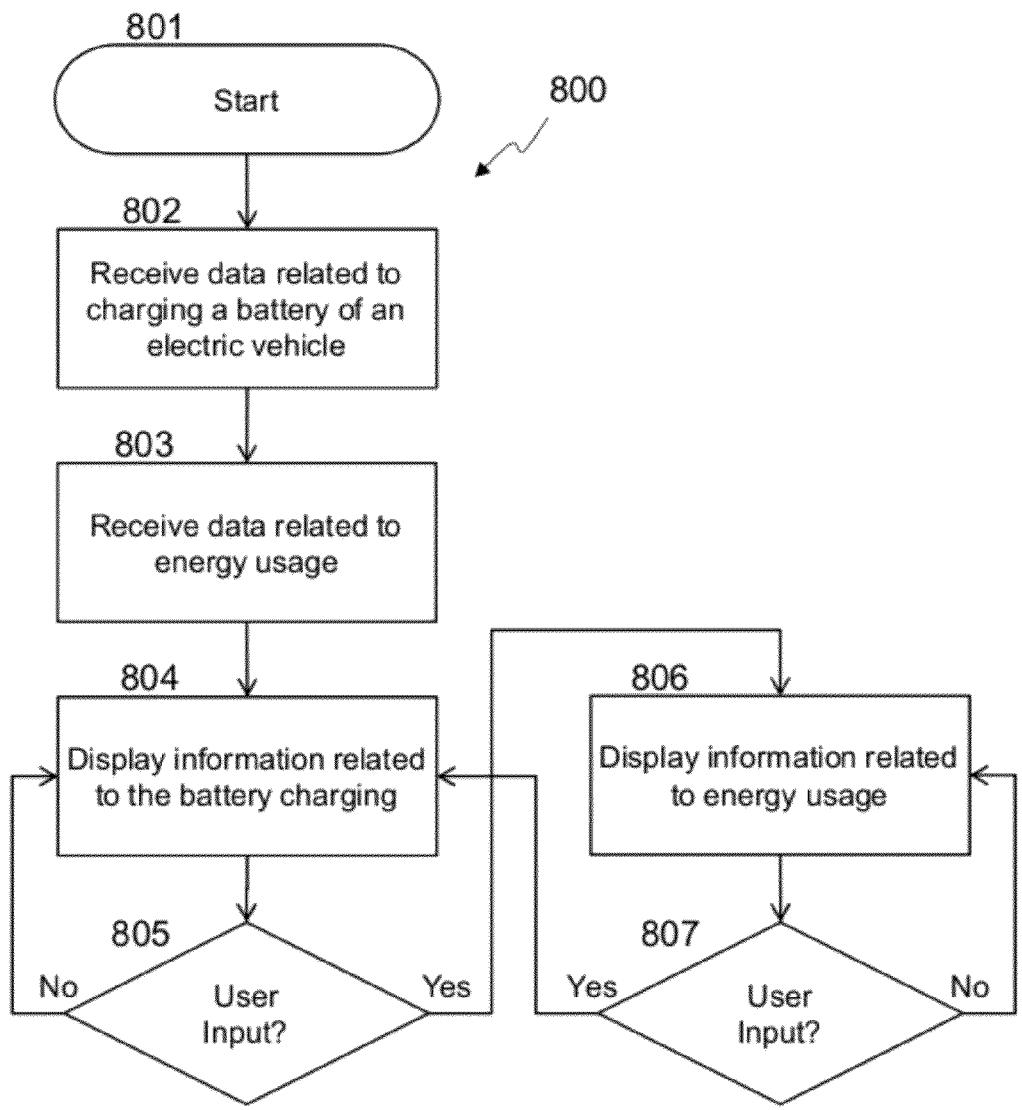
FIG. 8 is a flowchart of a method of displaying information about electric vehicle battery charging and home energy usage.

FIG. 8 is a flowchart 800 of a method of displaying information about electric vehicle battery charging and energy usage. The method starts at block 801 and data may be received over a network related to charging a battery of an electric vehicle at block 802. The network can be any type of network, including, but not limited to, a Wi-Fi, Zigbee, or Z-Wave network. In some embodiments the network may include the internet. The data received may include current battery charge level, intended charge level, charge start time, charge end time, cost of charging the battery, or other data. The method continues at block 803 by receiving data related to energy usage over the network. The data may be related to energy usage of a home, a business, a room, a community, or any other consumer of energy and may include instantaneous usage, historical usage, or current usage over a particular period of time such as a day or current billing period. The data may include wattage, kilowatt-hours, costs or any other type of data related to energy usage.

Information based on the data received related to the charging of the battery of the electric vehicle may be displayed at block 804 in a first operating mode. The information may be displayed on a display such as multi-mode display 100 using a set of fixed display elements. The elements may include an icon to represent an electric vehicle that might only be used in the first operating mode. A check may be made for user input at block 805. The user input may be a button or other type of user input on the display. If the user input is not detected, the information related to the battery charging continues to be displayed at block 804.

If the user input is detected, information based on the data received related to the energy usage may be displayed at block 806 using the set of fixed display elements in a second operating mode. A check may be made for user input at block 807. The user input may be the same input or a different input than the user input checked at block 805. If the user input is not detected, the information related to the energy usage continues to be displayed at block 806. If the user input is detected, the information related to the battery charging continues to be displayed at block 804.

Some of the information displayed in either the first and/or second operating mode may include cost information. To facilitate the display of such information on a fixed element display, the fixed set of displayable elements may include one or more currency symbols representing currency of various countries. Other fixed display elements may be useful for various other information.

Unless otherwise indicated, all numbers expressing quantities of elements, optical characteristic properties, and so forth used in the specification and claims are to be understood as being modified in all instances by the term "about." Accordingly, unless indicated to the contrary, the numerical parameters set forth in the preceding specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

As used in this specification and the appended claims, the singular forms "a", "an", and "the" include plural referents unless the content clearly dictates otherwise. Thus, for example, reference to an element described as "an LED" may refer to a single LED, two LEDs or any other number of LEDs. As used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between.

Any element in a claim that does not explicitly state "means for" performing a specified function, or "step for" performing a specified function, is not to be interpreted as a "means" or "step" clause as specified in 35 U.S.C. §112, ¶6.

In particular the use of "step of" in the claims is not intended to invoke the provision of 35 U.S.C. §112, 116.

The description of the various embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the intended scope of the present invention.

What is claimed is:

1. A display apparatus comprising:
   a display module comprising a fixed set of displayable elements, wherein the fixed set of displayable elements comprise an electric vehicle icon; and
   a networked controller to receive data related to charging an electric vehicle and to home energy usage over a network and to control the display module;
   wherein the display module is configured to turn on the electric vehicle icon and show information about the charging of the electric vehicle in a first operating mode of the display apparatus;
   the display module is configured to turn off the electric vehicle icon and show information about the home energy usage in a second operating mode of the display apparatus; and
   the display apparatus is separate from the electric vehicle and a charger for the electric vehicle.

2. The display apparatus of claim 1 wherein at least one subset of displayable elements of the fixed set of displayable elements has a different meaning in the first operating mode than the meaning of said at least one subset of displayable elements in the second operating mode.

3. The display apparatus of claim 2 wherein the at least one subset of displayable elements comprises a multi-purpose gauge, and the multipurpose gauge displays a battery charge level for the electric vehicle in the first operating mode and the home energy usage in the second operating mode.

4. The display apparatus of claim 1, further comprising:
   a transparent color overlay mounted over the display module;
   wherein the display module is a monochrome display.

5. The display apparatus of claim 1, further comprising:
   at least one user operable input mechanism;
   wherein the at least one user operable input mechanism may change the operating mode of the display between the first operating mode and the second operating mode.

6. The display apparatus of claim 1, wherein the fixed set of displayable elements further comprise
   at least one currency symbol.

7. The display apparatus of claim 1, wherein the fixed set of displayable elements further comprise
   two or more currency symbols to represent the currency of two or more different countries.

8. The display apparatus of claim 1, wherein the fixed set of displayable elements further comprise:
   two or more currency symbols to represent the currency of two or more different countries;
   an icon to represent a fan;
   an icon to represent air conditioning;
   an icon to represent a thermostat;
   a clock;
   a wireless signal strength meter; and
   a low battery indication.

9. A system to monitor charging an electric vehicle, the system comprising:
   a charger to charge a battery in the electric vehicle;
   a display apparatus, separate from the electric vehicle and charger, and configured to communicate with the charger, the display apparatus comprising:
   a display module comprising a fixed set of displayable elements, wherein the fixed set of displayable elements comprise an electric vehicle icon; and
   a networked controller to receive data related to charging an electric vehicle and home energy usage over a network and to control the display module;
   wherein the display module is configured to turn on the electric vehicle icon and show information about the charging of the electric vehicle in a first operating mode of the display apparatus; and
   the display module is configured to turn off the electric vehicle icon and show information about the home energy usage in a second operating mode of the display apparatus.

10. The system of claim 9, further comprising:
    a transparent color overlay mounted over the display module;
    wherein the display module is a monochrome display.

11. The system of claim 9, further comprising:
    at least one user operable input mechanism;
    wherein the operating mode of the display is changed between the first operating mode and the second operating mode in response to an operation of the at least one user operable input mechanism.

12. The system of claim 9, wherein the fixed set of displayable elements comprise
    at least one currency symbol.

13. The system of claim 9, wherein the fixed set of displayable elements comprise
    two or more currency symbols to represent the currency of two or more different countries.

14. A method comprising:
    receiving data related to charging a battery of an electric vehicle over a network;
    receiving data related to home energy usage over the network;
    displaying, on a display that is separate from the electric vehicle and a charger for the electric vehicle, information based on the data received related to the charging of the battery of the electric vehicle using a set of fixed display elements in a first operating mode;
    displaying information based on the data received related to the home energy usage using the set of fixed display elements in a second operating mode
    turning on an electric vehicle icon in the first operating mode; and
    turning off the electric vehicle icon in the second operating mode;
    wherein the set of fixed display elements includes the electric vehicle icon.

15. The method of claim 14, further comprising:
    detecting a user input; and
    switching operating modes based on the user input.

16. The method of claim 14, wherein the fixed set of displayable elements comprise
    at least one currency symbol.

17. The method of claim 14, wherein the fixed set of displayable elements comprise
    two or more currency symbols to represent the currency of two or more different countries.

* * * * *